United States Patent [19]
Lindau et al.

[11] Patent Number: 4,799,701
[45] Date of Patent: Jan. 24, 1989

[54] SCOOTER

[76] Inventors: Mark S. Lindau, 3100 Lake Mendota Dr., #302, Madison, Wis. 53705; Howard Clay, 2292 Foliage La., Rockford, Ill. 61109

[21] Appl. No.: 70,310

[22] Filed: Jul. 6, 1987

[51] Int. Cl.$^4$ .............................................. B62K 9/00
[52] U.S. Cl. ............................ 280/87.041; 280/11.2; 188/74
[58] Field of Search ................ 280/87.04 R, 87.02 R, 280/11.2, 779; 180/279; 188/17, 29, 74

[56] References Cited

U.S. PATENT DOCUMENTS

| | | | |
|---|---|---|---|
| D. 118,245 | 12/1939 | Rideout | D21/81 |
| D. 208,791 | 10/1967 | Purdy | D21/71 |
| 1,416,864 | 5/1922 | Parkes | 280/87.04 R |
| 1,418,569 | 6/1922 | Herrick | 280/7.12 |
| 1,425,880 | 8/1922 | Mack | 280/87.04 R |
| 1,468,346 | 9/1923 | Gedeon et al. | 280/221 |
| 1,472,611 | 10/1923 | Mettler | 280/87.02 R |
| 1,574,829 | 3/1926 | Lystad | 280/87.02 R |
| 1,951,277 | 3/1934 | Elliotte | 280/87.04 R |
| 1,977,035 | 10/1934 | Benjamin | 280/221 |
| 2,002,520 | 5/1935 | Bontrager | 280/254 |
| 2,439,556 | 4/1948 | Bancroft | 280/87.04 R |
| 2,460,395 | 2/1949 | Reid | 280/87.04 R |
| 2,468,910 | 5/1949 | Zsinor et al. | 280/87.04 R |
| 2,486,689 | 11/1949 | Tibores et al. | 280/87.04 R |
| 2,955,839 | 10/1960 | Paul | 280/87.04 R |
| 3,052,481 | 9/1962 | Kaufman | 280/7.1 |
| 3,086,795 | 4/1963 | Hatcher et al. | 280/221 |
| 3,117,653 | 1/1964 | Altherr | 188/29 |
| 3,288,251 | 11/1966 | Sakwa | 188/29 |
| 3,442,528 | 5/1969 | Rademacher | 280/87.04 R |
| 3,502,346 | 3/1970 | Cadiou | 280/779 |
| 3,647,241 | 3/1972 | Huyssen | 280/221 |
| 4,204,698 | 5/1980 | Mihalik | 280/87.04 R |

FOREIGN PATENT DOCUMENTS 515597 11/1920 France .
215869 10/1941 Switzerland .
143696 6/1920 United Kingdom .

Primary Examiner—David M. Mitchell
Assistant Examiner—Tamara L. Finlay
Attorney, Agent, or Firm—Lathrop & Clark

[57] ABSTRACT

An improved scooter has a yoke which connects the fork and platform together so that the fork and front wheel can be directionally pivoted to steer the scooter. The yoke includes a bracket and a plate member which each are comprised of a single sheet of metal. The bracket includes a substantially cylindrical housing with a seam portion, two approximately vertical panels which extend generally rearwardly, outwardly, and downwardly from the housing to a horizontal bottom of each panel, and two supports which each extend horizontally inwardly from one of the panel bottoms to provide a surface on which the front of the platform is mounted. The plate member includes a flat portion which extends substantially horizontally between the two panels spaced above the supports to overlie and connect to the front of the platform. The plate member is affixed to both panels. At least one of the scooter wheels has a rim which includes at least one outwardly extending cylindrical braking surface. The scooter preferably has a brake which includes a lever which at a pivotal end thereof is pivotally attached to the scooter near an end of the adjacent wheel, and which at a pedal end includes a pedal which is adapted to allow the operator to push the lever pedal end with a foot. The brake also includes at least one force member which at a first end thereof is connected to the lever between the pivotal end thereof and the pedal. Each force member extends along a side of the adjacent wheel to a second end which is located adjacent to one of the braking surfaces and which is semi-circular in shape to substantially conform to the braking surface. Attached to each force member's second end is a brake pad which transmits the frictional braking force to the braking surface when the operator pushes the pedal.

22 Claims, 4 Drawing Sheets

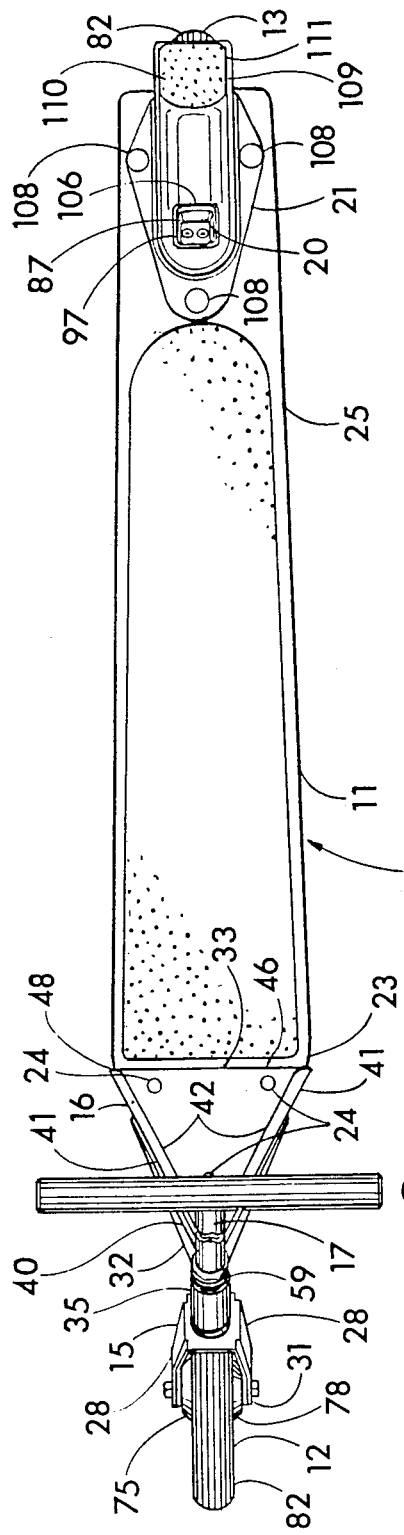
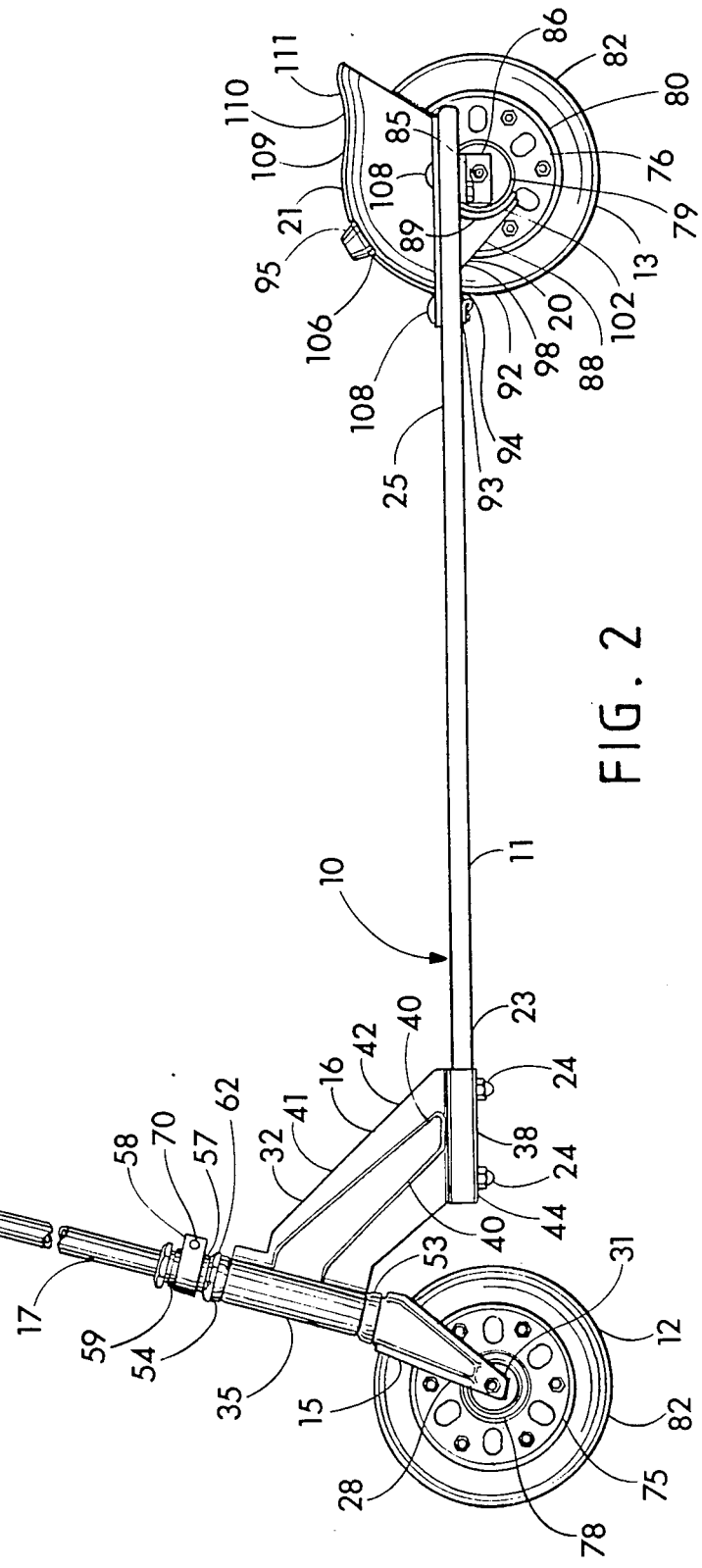

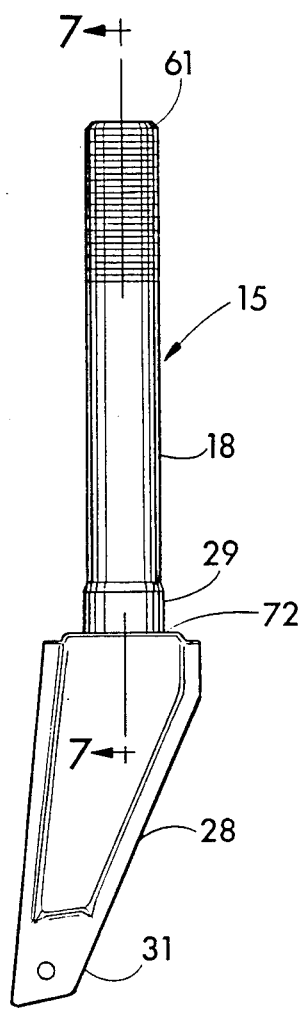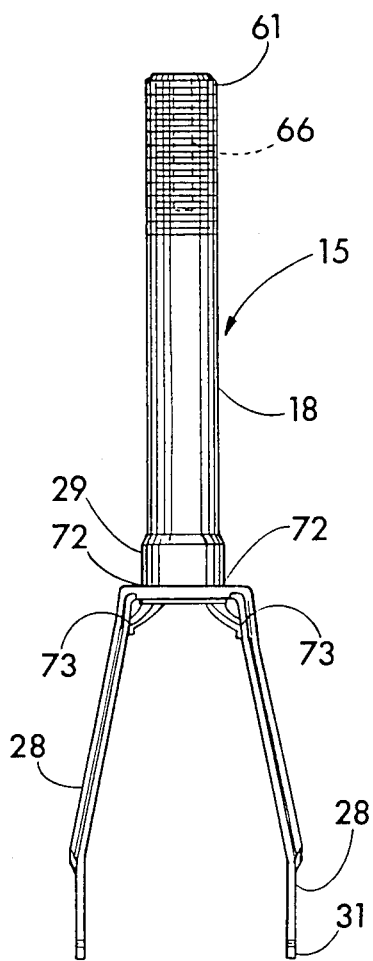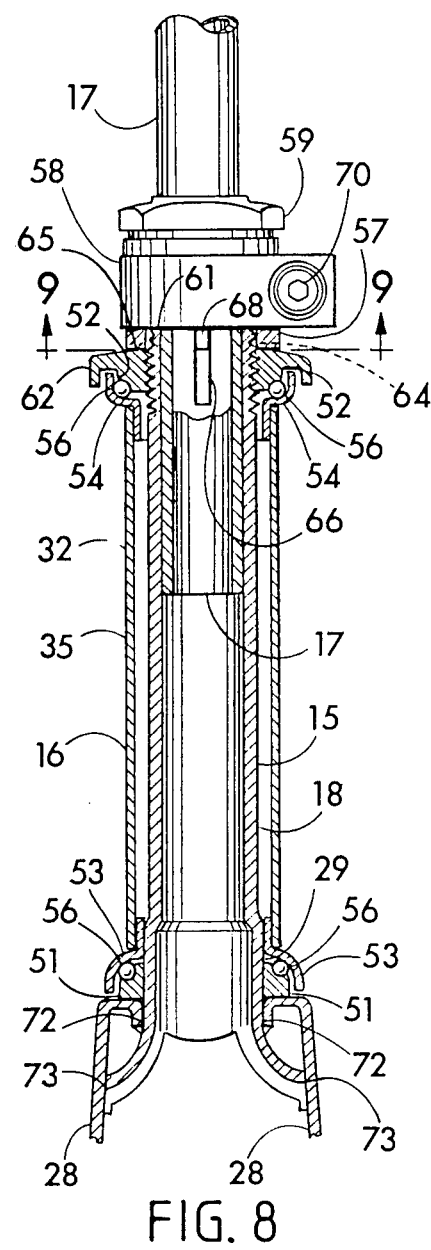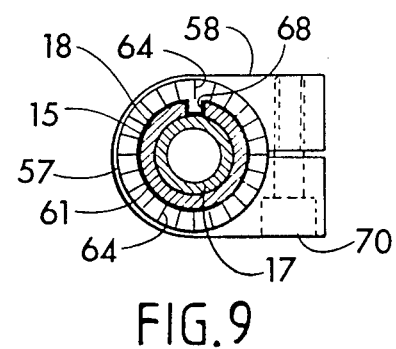

SCOOTER

BACKGROUND OF THE INVENTION

1. Field of the Invention

The present invention relates to scooters, and particularly to scooters having two wheels, a platform, a fork, a brake, and a yoke which is formed from sheet metal to connect the platform and fork.

2. Description of the Prior Art

Scooters typically have two or three wheels, a platform for the rider to stand or sit on, a fork on which the front wheel is mounted, a steering column connected to the fork for steering the scooter, and a yoke which connects the fork or steering column pivotally to the platform. Often the yoke and platform are formed of a single piece of material such as is disclosed in U.S. Pat. No. 2,460,395 to Reid, and U.S. Pat. No. 2,486,689 to Tibores et al. Some scooters or three-wheeled vehicles have metal frames which undergird a platform which is made out of some other material such as is disclosed in U.S. Pat. No. 1,574,829 to Lystad, and U.S. Pat. No. 3,052,481 to Kaufman. Non-metalic materials exist which have sufficient flexural strength to support the weight of the operator without the help of an undergirding steel frame. However, a yoke is necessary to connect such a platform to the front fork or steering column. It is desirable that such a yoke be simple in design, and be easily and inexpensively manufactured. The yoke must have sufficient strength to support and hold both the fork and the end of the platform which is connected to the yoke.

Simple brake mechanisms have commonly been used on scooters. One type of brake mechanism is shown in U.S. Pat. No. 2,460,395 to Reid, and U.S. Pat. No. 2,439,556 to Bancroft. The brake mechanism shown in these patents is a single piece mechanism which is pivotally connected to the back of the platform and includes a pedal portion for pressing by the operator's foot, and a shoe portion which rubs against the rubber rear tire. Since this type of brake mechanism rubs directly against the tire, the mechanism preferably would not be used in newer scooters which utilize pressurized, air-filled tires. If the air-filled tire becomes too worn, it may blow out. U.S. Pat. No. 2,002,520 to Bontrager, and U.S. Pat. No. 1,951,277 to Elliotte each disclose modified forms of this typical brake mechanism which presses directly against the rubber tire to brake the scooter.

SUMMARY OF THE INVENTION

The present invention is summarized in that an improved scooter includes a platform on which an operator can stand, a fork including a stem and two prongs descending therefrom, a rear wheel, a front wheel, and a yoke which connects the fork and platform together so that the fork and front wheel can be directionally pivoted by the operator in relation to the platform to steer the scooter. The platform includes a front, and a back which forms a longitudinal central slot into which the rear wheel is rotatably mounted. The front wheel is positioned between the prongs of the fork and is rotatably connected to ends of the prongs. The yoke includes a bracket comprised of a single metal sheet including a substantially cylindrical housing with a seam portion; two approximately vertical panels which extend generally rearwardly, outwardly, and downwardly from the housing to a horizontal bottom of each panel; and two supports which each extend horizontally inwardly from one of the panel bottoms to provide a surface on which the front of the platform is mounted. The fork stem is pivotally mounted within the cylindrical housing of the yoke bracket to allow the stem to pivot freely within the housing. The yoke further includes a plate member comprised of a single metal sheet including a flat portion which extends substantially horizontally between the two bracket panels spaced above the supports to overlie and connect to the front of the platform, and two legs which each extend downwardly from outer margins of the flat portion adjacent to one of the panels. Each leg is affixed to the adjacent panel. The front of the platform is inserted into the yoke between the flat portion of the plate member, and the two supports on the bracket.

Preferably, at least one of the wheels includes a rim with at least one outwardly extending cylindrical braking surface, and the scooter preferably further includes at least one brake which acts on the braking surfaces to stop the scooter. The brake includes a lever which at a pivotal end thereof is pivotally attached to the scooter near an end of the wheel, and which at a pedal end includes a pedal which is adapted to allow the operator to push the lever pedal end with a foot; and at least one force member which at a first end thereof is connected to the lever between the pivotal end thereof and the pedal to gain a mechanical advantage. The force members each extend along a side of the adjacent wheel to a second end which is located adjacent to one of the braking surfaces on the adjacent wheel and which is semi-circular in shape to substantially conform to the wheel braking surface. The brake further includes at least one brake pad, each of which is attached to the semi-circular second end of one force member to transmit frictional braking force to the braking surface when the operator pushes the pedal.

Preferably, the scooter includes a rear fender which is attached to the platform at the back thereof to overlie the slot and substantially cover the brake and a top portion of the rear wheel. The rear fender defines a pedal opening through which the brake pedal extends upwardly from the lever to be accessible to the foot of the operator.

A primary object of the invention is to provide an improved scooter having a yoke which includes a bracket formed from a single sheet of metal, and a plate member which also is formed from a single sheet of metal and which is affixed to the bracket to form the yoke.

Another object of the present invention is to provide a scooter having a yoke which is easily and inexpensively fabricated.

An additional object of the present invention is to provide a scooter having a yoke which has sufficient structural strength to support and connect the front of the platform to the scooter fork or steering column.

A further object of the present invention is to provide a scooter having a brake which can be used to brake wheels having air filled rubber tires without damaging them.

Yet another object of the present invention is to provide a scooter having a brake which applies a frictional braking force to an outwardly extending rigid cylindrical surface on the wheel to stop the scooter.

Yet an additional object of the present invention is to provide a scooter having a rear fender with a substantially horizontal foot rest to the rear of the rear wheel axle, so that the operator can push down on the foot rest to raise the front wheel of the scooter off from the ground.

Other objects, features, and advantages of the invention will be apparent from the following detailed description taken in conjunction with the accompanying drawings wherein a preferred embodiment of the invention has been selected for exemplification.

BRIEF DESCRIPTION OF THE DRAWINGS

FIG. 1 is a top plan view of an improved scooter in accordance with the invention.

FIG. 2 is a side view thereof.

FIG. 6 is a side view of the fork which is used in the preferred embodiment of the invention.

FIG. 7 is a front view of the fork shown in FIG. 6.

FIG. 8 is a section view taken along section line 7—7 of FIG. 6, also showing the fork assembled to the steering column and yoke.

FIG. 9 is a section view taken along section line 9—9 of FIG. 8.

DESCRIPTION OF THE PREFERRED EMBODIMENT

Figure 3:
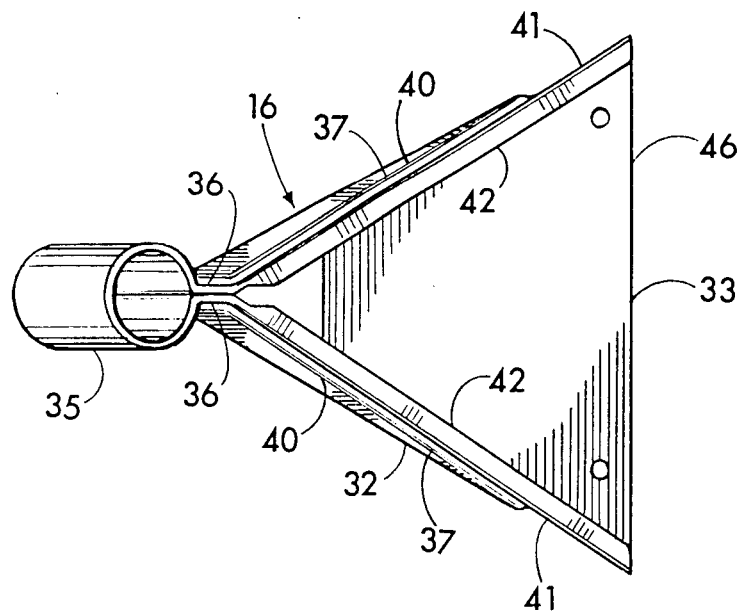
FIG. 3 is a top plan view of a yoke, in accordance with the invention, for connecting the fork and platform together so that the fork and front wheel can be pivoted to steer the scooter.

Referring more particularly to the drawings, wherein like numbers refer to like parts, FIGS. 1 and 2 show an improved scooter 10 which is for the most part constructed of steel and uni-directional fiberglas with a wooden core. The scooter 10 includes a platform 11 on which the operator can stand, two wheels 12 and 13, a fork 15 on which the front wheel 12 is rotatably mounted, and a pivotal connector which preferably is formed by the yoke 16. The preferred scooter 10 also includes a steering column 17 which is connected to the stem 18 of the fork 15 to allow the operator to directionally pivot the fork 15 and front wheel 12 to thereby steer the scooter 10, and a brake 20 which is used to brake the rear wheel 13, and a rear fender 21 which overlies the brake 20 and rear wheel 13.

As shown in FIGS. 1, 2, 10, and 11, the platform 11 includes a front 23 which extends into the yoke 16, and is attached thereto with the fasteners shown at 24, and a back 25 which forms a rearward opening longitudinal central slot 27 for receiving the rear wheel 13. The platform 11 preferably is made from uni-directional fiberglas with a wooden core, which is flexible enough to bend gently when the operator applies the force of his/her weight to the platform 11. The rear wheel 13 is rotatably mounted to the platform 11 at the back 25 thereof so that it is positioned substantially within the slot 27. The fork 15 includes the stem 18 and two prongs 28 which each descend from a swaged bottom end 29 of the stem 18 as shown in FIGS. 6–8. Each prong 28 extends downwardly to terminate at end 31 where the front wheel 12 is rotatably connected. Thus, the front wheel 12 is positioned between the two prongs 28. Preferably, the prongs 28 are each welded to the stem 18 as shown at 72 and 73 in FIG. 8.

Figure 4:
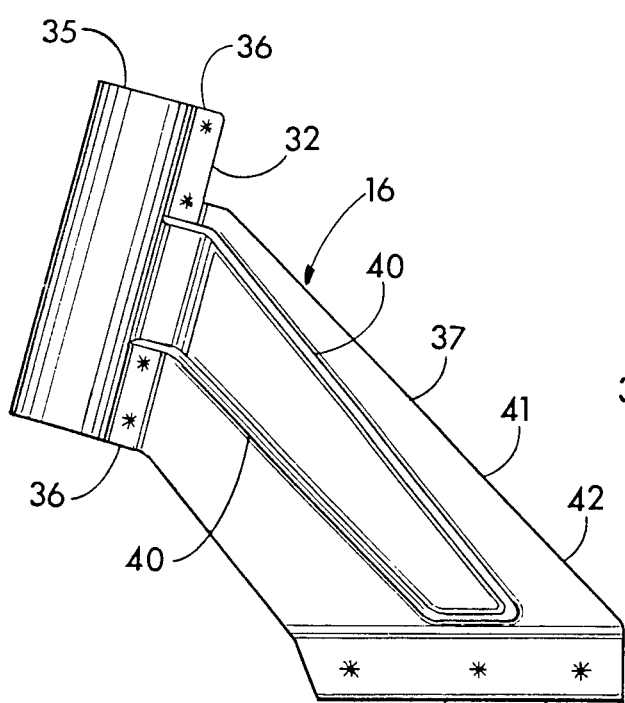
FIG. 4 is a side view of the yoke.
Figure 5:
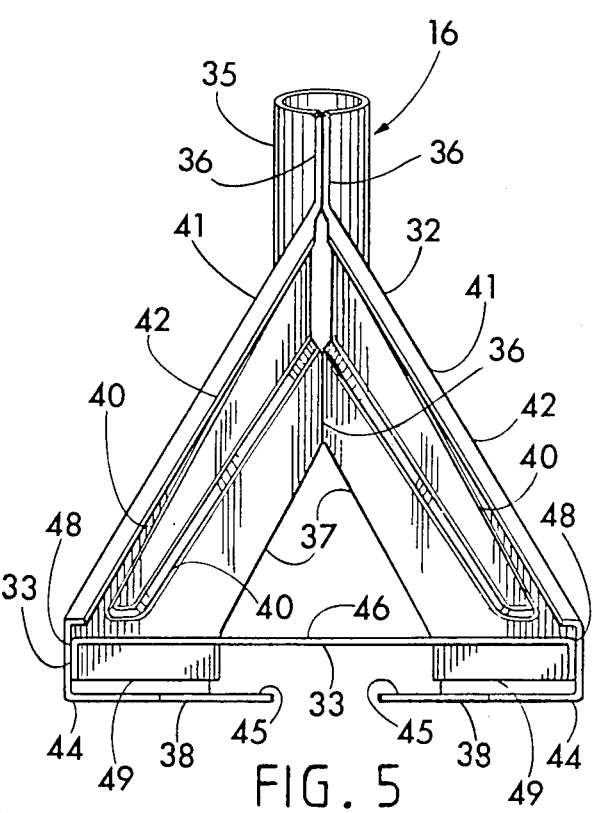
FIG. 5 is a rear view of the yoke.

The yoke 16 connects the fork 15 and platform 11 together so that the fork 15 and front wheel 12 can be directionally pivoted by the operator in relation to the platform 11 to steer the scooter 10. The yoke 16 includes a bracket 32 and a plate member 33 which are each comprised of a single sheet of steel which has been pressed and bent to form the bracket 32 or plate member 33. The bracket 32 includes a substantially cylindrical housing 35 with a seam portion 36, two approximately vertical panels 37, and two supports 38. The steel sheet is bent to form the cylindrical housing 35 until it is nearly closed at the seam portions 36 which extend slightly rearwardly. The seam portions 36 are welded together as shown in FIG. 4. The steel sheet is bent rearwardly to form both the seam portions 36 and the panels 37 as is shown in FIGS. 3 through 5. When the bracket 32 is pressed and fabricated, the longitudinal central crimps 40 are formed to increase the flexural strength of the panels 37. Along the top edges 41 of the panels 37, the steel sheet is bent inwardly to form the flanges 42 as shown in FIGS. 1, 3, and 5. The flanges 42 protect the operator from being cut by the top edges 41 of the panels 37. The two panels 37 preferably extend generally rearwardly, outwardly, and downwardly from the housing 35 to a horizontal bottom 44 of each panel 37. The steel sheet forming the bracket 32 is then bent horizontally inwardly at the horizontal bottom 44 of each panel 37 to form the supports 38. Each support 38 has a surface 45 on which the front 23 of the platform 11 is mounted. These surfaces 45 are shown best in FIG. 5. FIGS. 1 and 2 show the front 23 of the platform 11 connected to the surfaces 45 by the fasteners 24.

The plate member 33 is also formed from a single sheet of steel. The plate member 33 includes a flat portion 46 which extends substantially horizontally between the two panels 36 so as to be spaced above the supports 38. At the outer margins 48 of the flat portion 46, the steel sheet is preferably bent downwardly to form two legs 49. The preferred plate member 33 is thus a channel-shaped structure. The plate member 33 is positioned within the bracket 32 so that the two legs 49 extend downwardly from the outer margins 48 of the flat portion 46 adjacent to the panels 37. Each leg 49 is preferably welded to the adjacent panel 37 as shown in FIGS. 4 and 5. If the plate member 33 has no legs 49, the flat portion 46 could be affixed in some other manner to the panels 37, such as by direct welds or by small brackets with screws. In the preferred scooter 10, the flat portion 46 of the plate member 33 overlies and connects to the front 23 of the platform 11 by way of the fasteners 24.

The fork stem 18 is pivotally mounted within the housing 35 as shown in FIGS. 1, 2, 8, and 9. As shown in these FIGS., it is preferred that the fork 15 be pivotally mounted to the housing 35 using a conventional headset which has typically been used in bicycles. As is best shown in FIG. 8, the headset includes the lower fork bearing track 51 and the upper fork bearing track 52, which are connected to the fork 15 to oppose the lower housing bearing track 53 and the upper housing bearing track 54, which in turn are connected to the housing 35, and the ball bearings 56 which are located between the opposed bearing tracks 51 and 53, and 52 and 54. The headset also preferably includes the cap 62, the lock piece 57, the clamp 58, and the lock nut 59. The upper end 61 of the fork stem 18 is threaded as shown in FIGS. 6–8. The upper fork bearing track 52 is formed on the cap 62 which is threaded so that it can be screwed over the stem 18 to determine how tightly the bearing tracks 51–54 bear against the ball bearing 56. As shown in FIG. 9, the lock piece 57 has radial splines 64 which face downwardly and mate with upwardly facing radial splines 65 on the cap 62. The upper end 61 of the stem 18 has a slot 66 which is shown in FIGS. 7–9. As shown in FIGS. 8 and 9, the lock piece 57 includes a tab 68 which extends inwardly into the slot 66 to prevent the lock piece 57 from rotating, so that as the radial splines 64 of the lock piece 57 bear down on the upwardly facing radial splines 65 of the cap 62, the cap 62 also is prevented from rotating. The lock nut 59 is threaded so that is can screw over the upper end 61 of the stem 18. By tightening the lock nut 59, it is ensured that the lock piece 57 will press down upon the cap 62. The steering column 17 is inserted into the hollow stem 18 as shown in FIG. 8. The slot 66 allows the upper end 61 of the stem 18 to be tightened onto the column 17 by tightening the screw 70 in the clamp 58. The position of the steering column 17 within the stem 18 can be adjusted by loosening the screw 70, moving the steering column 17 to its desired position, and then tightening the screw 70.

Figure 10:
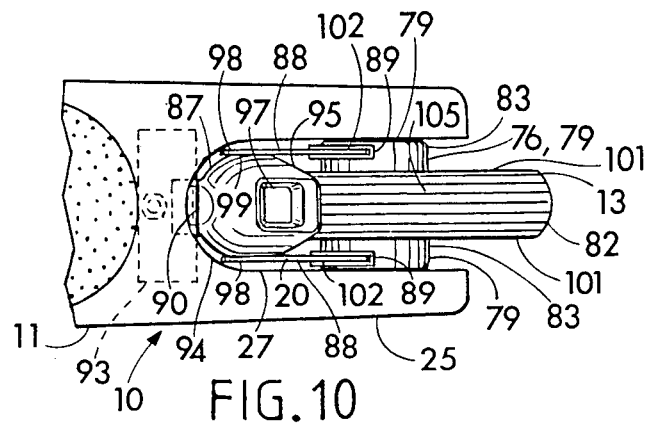
FIG. 10 is a top plan view of the rear wheel, brake, and platform back with the rear fender removed.
Figure 11:
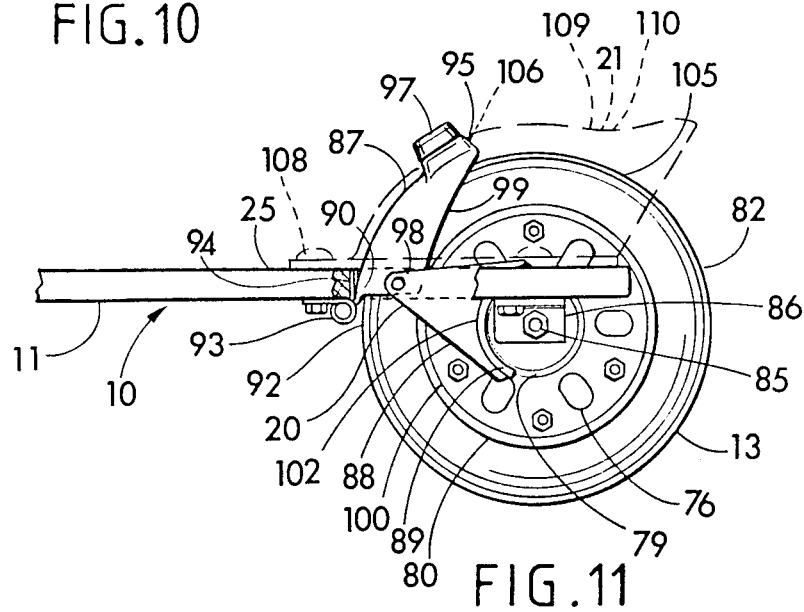
FIG. 11 is a side view of the rear wheel, brake, and platform back with the rear fender shown in dashed lines.
Figure 12:
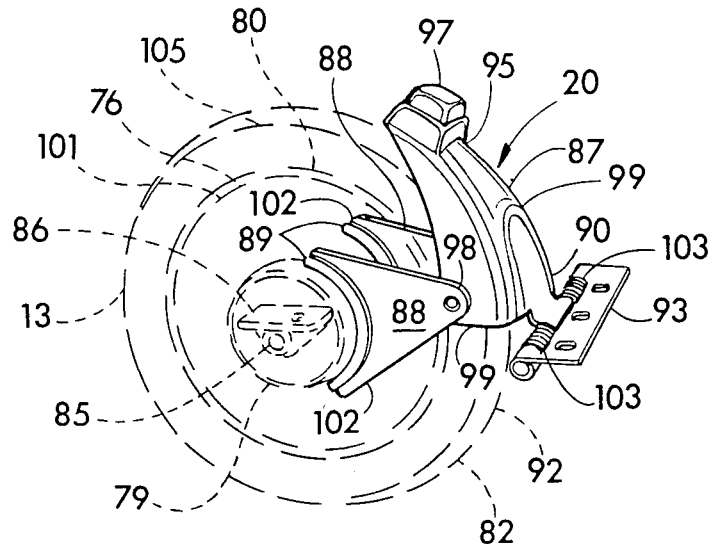
FIG. 12 is a perspective view of the brake in accordance with the invention, with the brake shown adjacent to a wheel shown in dashed lines.

Each wheel 12 or 13 includes a rim 75 or 76 which includes two hubs 78 or 79 and an outer portion 80 into which the pressurized rubber tires 82 are seated. As shown in FIGS. 10–12, the two hubs 79 of the rear wheel 35 are each enlarged to form an outwardly extending cylindrical braking surface 83. Located nearby is the brake 20. Alternatively, the hub 78 of the front wheel 12 instead could be enlarged to have outwardly extending cylindrical braking surfaces so that a front brake could be included on the scooter 10. The rear wheel axle 85 is attached to the back 25 of the platform 11 by the small brackets as shown at 86 in FIGS. 11 and 12.

As shown in FIGS. 1, 2, 10, and 11, the brake 20 is located near the rear wheel 13 in this preferred embodiment. The brake 20 shown includes a lever 87, two force members 88, and two brake pads 89. The lever 87 at its pivotal end 90 is pivotally attached to the scooter 10 near an end 92 of the wheel 13. Specifically, the pivotal end 90 of the lever 87 is attached by the hinge 93 to the front end 94 of the slot 27. It is preferred that the hinge 93 include a spring 103 which biases the lever 87 upwardly to keep the brake 20 disengaged. At a pedal end 95 of the lever 87 is a pedal 97 which is adapted to allow the operator to push the lever pedal end 95 with his/her foot. As shown in FIG. 12, the lever 87 is shaped to avoid touching the rubber tire 82. The lever 87 is thus preferably arcuate along its length, and has two sides 99 which each extend along a side 101 of the rear wheel 13. Two force members 88 at their first ends 98 are connected to the opposite sides 99 of the lever 87 between the pivotal end 90 of the lever 87 and the pedal 97 to thereby gain a mechanical advantage. As the operator presses the pedal 97 with the force of his/her foot, an even greater amount of force is transmitted by the lever 87 to the force members 88, because the force members 88 are closer to the pivotal end 90 (fulcrum) of the lever 87 than the pedal 97 where the force is applied. Both force members 88 extend along the sides 101 of the rear wheel 13 to second ends 102 which are each located adjacent to one of the braking surfaces 83 as shown in FIGS. 10–12. Thus the two force members 88 are preferably positioned in a generally spaced parallel relationship to one another. The second ends 102 of the force members 88 are each semi-circular in shape to substantially conform to the adjacent braking surface 83. Attached to each second end 102 of a force member 88 is a brake pad 89 which transmits fricitonal braking force to the adjacent braking surface 83 when the pedal 97 of the lever 87 is pushed by the operator. As shown in FIGS. 11 and 12, the force members 88 are pivotally connected to the lever 87 at their first end 98. It is preferred that this pivotal connection be fairly rigid so that the pads 89 do not drag on the braking surfaces 83. However, there may be some ability to pivot the force members 88 in relation to the lever 87 to allow for adjusting the position of the brake 20 when it is installed. The operator may operate the brake 20 by resting the front of his/her foot on the platform 11 near the brake, and the back of his/her foot on the pedal 97 and then simply pressing.

Although the brake 20 shown in FIGS. 10–12 has two force members 88 and two brake pads 89 which apply a braking force to two braking surfaces 83 on the rear wheel 13, alternatively, a wheel might have only one braking surface 83 which is braked by a brake 20 having only one force member 88 and one brake pad 89. The brake 20 shown in FIGS. 1, 2, 10, 11, and 12 is installed to brake the rear wheel 13. Alternatively, brake 20 could instead be installed to brake the front wheel 12. In such an embodiment, the front wheel 12 would have to have an enlarged hub 78 with one or two outwardly extending cylindrical braking surfaces, as already discussed.

As shown in FIGS. 1, 2, 10, and 11, the scooter 10 includes a rear fender 21 which is attached to the back 25 of the platform 11 to overlie the slot 27 and substantially cover the brake 20 and a top portion 105 of the rear wheel 13. The rear fender 21 has a pedal opening 106 through which the brake pedal 97 extends upwardly from the lever 87 to be accessible to the foot of the operator. The fender 21 is attached to the back 25 of the platform 11 by means of the fasteners 108 as shown in FIGS. 1 and 2. A rear top portion 109 of the rear fender 21 forms a substantially horizontal foot rest 110 with a rough surface 111 for preventing slippage of the foot resting thereon. The roughened surface 111 may be formed by using an adhesive or other means to apply emery cloth or another rough material to the horizontal foot rest 110. Since the substantially horizontal foot rest 110 extends to the rear of the rear wheel axle 85, by applying pressure to the foot rest 110, the operator can lift up the front wheel 12 of the scooter 10 to thereby perform what is commonly known as a "wheelie", or "popping a wheelie". The fender not only protects the brake 20 and allows the operator to "pop wheelies", but also protects the operator from getting a streak of mud up his/her back when operating the scooter 10 in rainy weather. Although the fender 21 as shown is located over the rear wheel 13, alternatively a fender could also be used to cover the front wheel 12.

The yoke 16 is a structural member of the scooter which is easily and inexpensively manufactured from sheet metal, and yet has sufficiently strength and durability to hold up to the inevitable rough use of the scooter 10. The brake 20 is a simple mechanism which allows the operator to stop the scooter 10 quickly with his/her foot, even though the scooter has pressurized rubber tires 82.

It is to be understood that the present invention is not limited to the particular arrangements and embodiments of parts disclosed and illustrated herein, nor to the materials specified, but embraces all such modified forms thereof as come within the scope of the following claims.

What is claimed is:

1. An improved scooter comprising:
   (a) a flexible platform which can support the weight of an operator, the platform including a front and a back, the back forming a longitudinal central slot;
   (b) a fork including a stem and two prongs descending therefrom, each prong terminating at an end;
   (c) a rearwheel which is mounted to the platform at the back thereof so as to be located within the slot for rotation;
   (d) a front wheel which is mounted between the prong ends of the fork for rotation;
   (e) a yoke which connects the fork and plaform together so that the fork and front wheel can be directionally pivoted by the operator in relation to the platform, the yoke including:
      (i) a bracket comprised of a single metal sheet and including a substantially cylindrical housing with a seam portion, the fork stem being pivotally mounted within the housing to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which the front of the platform is mounted; and
      (ii) a plate member comprised of a single metal sheet and including a flat portion which extends substantially horizontally between the two panels spaced above the supports to overlie and connect to the front of the platform so that the platform is fastened between the flat portion and the bracket supports, the plate member being affixed to the two panels; and
   (f) a steering column which is connected to the fork stem to allow the operator to steer the scooter.

2. The scooter specified in claim 1 wherein each panel defines a longitudinal central crimp therein which increases the flexural strength of the panel.

3. An improved scooter comprising:
   (a) a platform which can support the weight of an operator, the platform including a front and a back, the back forming a longitudinal central slot;
   (b) a fork including a stem and two prongs descending therefrom, each prong terminating at an end;
   (c) a rearwheel which is mounted to the platform at the back thereof so as to be located within the slot for rotation;
   (d) a front wheel which is mounted between the prong ends of the fork for rotation;
   (e) a yoke which connects the fork and platform together so that the fork and front wheel can be directionally pivoted by the operator in relation to the platform, the yoke including:
      (i) a bracket comprised of a single metal sheet and including a substantially cylindrical housing with a seam portion, the fork stem being pivotally mounted within the housing to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which the front of the platform is mounted; and
      (ii) a plate member comprised of a single metal sheet and including a flat portion which extends substantially horizontally between the two panels spaced above the supports to overlie and connect to the front of the platform, the plate member being affixed to the two panels; and
   (f) a steering column which is connected to the fork stem to allow the operator to steer the scooter;
   wherein the two panels each include a flange which extends inwardly from a top edge of the panel to protect the operator from being cut by the top edge.

4. An improved scooter comprising:
   (a) a platform which can support the weight of an operator, the platform including a front and a back, the back forming a longitudinal central slot;
   (b) a fork including a stem and two prongs descending therefrom, each prong terminating at an end;
   (c) a rearwheel which is mounted to the platform at the back thereof so as to be located within the slot for rotation;
   (d) a front wheel which is mounted between the prong ends of the fork for rotation;
   (e) a yoke which connects the fork and platform together so that the fork and front wheel can be directionally pivoted by the operator in relation to the platform, the yoke including:
      (i) a bracket comprised of a single metal sheet and including a substantially cylindrical housing with a seam portion, the fork stem being pivotally mounted within the housing to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which the front of the platform is mounted; and
      (ii) a plate member comprised of a single metal sheeet and including a flat portion which extends substantially horizontally between the two panels spaced above the supports to overlie and connect to the front of the platform, the plate member being affixed to the two panels; and
   (f) a steering column which is connected to the fork stem to allow the operator to steer the scooter;
   wherein the plate member further includes two legs which each extend downwardly from an outer margin of the flat portion adjacent to one of the panels, each leg being affixed to the adjacent panel to thereby affix the plate member to the panels.

5. The scooter specified in claim 4 wherein the cylindrical housing is welded closed at the seam portion, and the plate member legs are each welded to the adjacent bracket panel.

6. An improved scooter comprising:
   (a) a platform which can support the weight of an operator, the platform including a front and a back, the back forming a longitudinal central slot;
   (b) a fork including a stem and two prongs descending therefrom, each prong terminating at an end;

(c) a rearwheel which is mounted to the platform at the back thereof so as to be located within the slot for rotation;

(d) a front wheel which is mounted between the prong ends of the fork for rotation;

(e) a yoke which connects the fork and platform together so that the fork and front wheel can be directionally pivoted by the operator in relation to the platform, the yoke including:

(i) a bracket comprised of a single metal sheet and including a substantially cylindrical housing with a seam portion, the fork stem being pivotally mounted within the housing to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which the front of the platform is mounted; and (ii) a plate member comprised of a single metal sheet and including a flat portion which extends substantially horizontally between the two panels spaced above the supports to overlie and connect to the front of the platform, the plate member being affixed to the two panels; and (f) a steering column which is connected to the fork stem to allow the operator to steer the scooter;

wherein at least one of the wheels includes a rim with at least one outwardly extending cylindrical braking surface; and wherein the scooter further includes at least one brake comprising:

(i) a lever which at a pivotal end thereof is pivotally attached to the scooter near an end of the wheel, and which at a pedal end includes a pedal which is adapted to allow the operator to push the lever pedal end with a foot;

(ii) at least one force member which at a first end thereof is connected to the lever between the pivotal end thereof and the pedal to gain a mechanical advantage, the force members each extending along a side of the adjacent wheel to a second end which is located adjacent to one of the braking surfaces and which is semi-circular to substantially conform in shape to the braking surface; and (iii) at least one brake pad, each of which is attached to the semi-circular second end of one force member to transmit frictional braking force to the braking surface when the operator pushes the pedal.

7. The scooter specified in claim 6, wherein there are two outwardly extending cylindrical braking surfaces on each wheel which is adjacent to a brake, and there are two force members connected to each brake lever at opposite sides thereof, the force members being in spaced parallel relation to one another on both sides of the wheel, and wherein there are two brake pads which are each attached to the semi-circular second end of one of the force members.

8. The scooter specified in claim 6, wherein the force members are pivotally connected to the lever.

9. The scooter specified in claim 6 wherein the lever is pivotally connected to the platform near a front end of the slot, and the rear wheel includes said braking surfaces, so that the brake can be used to brake the rear wheel.

10. The scooter specified in claim 9 further including a rear fender which is attached to the platform at the back thereof to overlie the slot and substantially cover the brake and a top portion of the rear wheel, the rear fender defining a pedal opening through which the brake pedal extends upwardly from the lever to be accessible to the foot of the operator.

11. The scooter specified in claim 10 wherein the rear top portion of the rear fender forms a substantially horizontal foot rest with a rough surface for preventing slippage of the foot of the operator resting thereon, wherein the foot rest extends to the rear of an axle of the rear wheel so that the operator can lift the front wheel off from a surface on which the scooter is being operated by pushing the foot downwardly on the foot rest.

12. An improved scooter comprising:

(a) a platform which can support the weight of an operator;

(b) a fork including a stem and two prongs descending therefrom, each prong terminating at an end;

(c) a rear wheel which is mounted to the platform for rotation, and a front wheel which is mounted between the prong ends of the fork for rotation, wherein at least one of the wheels includes a rim with at least one outwardly extending cylindrical braking surface;

(d) a pivotal connector which pivotally connects the fork to the platform so that the fork and front wheel can be directionally pivoted by the operator in relation to the platform to thereby steer the scooter; and (e) at least one brake which includes:

(i) a lever which at a pivotal end thereof is pivotally attached to the scooter, and which at a pedal end includes a pedal which is adapted to allow the operator to push the lever pedal end with a foot;

(ii) at least one force member which at a first end thereof is pivotally connected to the lever between the pivotal end thereof and the pedal to gain a mechanical advantage, the force members each extending along a side of the adjacent wheel to a second end which is located adjacent to one of the braking surfaces and which is semi-circular to substantially conform in shape to the adjacent braking surface; and (iii) at least one brake pad, each of which is attached to the semi-circular second end of one force member to transmit frictional braking force to the braking surface when the operator pushes the pedal;

wherein there are two outwardly extending circular braking surfaces on each wheel which is adjacent to a brake, and there are two force members connected to the lever of each brake at opposite sides of the lever, the force members of each brake being in spaced parallel relation to one another on both sides of the adjacent wheel, and wherein there are two brake pads for each brake, the brake pads each being attached to the semi-circular second end of one of the force members.

13. The scooter specified in claim 12 wherein said lever is pivotally connected to the platform near one end of the rear wheel, and the rear wheel includes said braking surfaces, so that the operator can brake the rear wheel.

14. The scooter specified in claim 13 further including a rear fender which is attached to the platform at a back thereof to substantially overlie the brake and a top portion of the rear wheel, the rear fender defining a pedal opening through which the brake pedal extends upwardly from the lever to be accessible to the foot of the operator.

15. The scooter specified in claim 14 wherein a rear top portion of the rear fender forms a substantially horizontal foot rest with a rough surface for preventing slippage of the foot resting thereon, the foot rest extending rearwardly of an axle of the rear wheel so that the operator can lift the front wheel of the scooter off of a surface on which the scooter is operated by pushing downwardly on the foot rest with the foot.

16. A yoke which, in a scooter having a fork and a flexible platform, is adapted to pivotally connect the fork to the platform so that the fork and a connected front wheel can be directionally pivoted by an operator in relation to the platform, the yoke comprising:
   (a) a bracket comprised of a single metal sheet and including a substantially cylindrical housing with a seam portion, the cylindrical housing being adapted to pivotally house a stem of the fork to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which a front of the platform is mounted; and
   (b) a plate member comprised of a single sheet of metal and including a flat portion which extends substantially horizontally between the two panels spaced above the supports to overlie and connect to the front of the platform so that the platform is fastened between the flat portion and the bracket supports, the plate member being affixed to the two panels.

17. A yoke which, in a scooter having a fork and a platform, is adapted to pivotally connect the fork to the platform so that the fork and a connected front wheel can be directionally pivoted by an operator in relation to the platform, the yoke comprising:
   (a) a bracket comprised of a single metal sheet and including a substantially cylindrical housing with a seam portion, the cylindrical housing being adapted to pivotally house a stem of the fork to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which a front of the platform is mounted; and
   (b) a plate member comprised of a single sheet of metal and including a flat portion which extends substantially horizontally between the two panels spaced above the supports to overlie and connect to the front of the platform, the plate member being affixed to the two panels;
   wherein the two panels each include a flange which extends inwardly from a top edge of the panel to protect the operator from being cut by the top edge.

18. A yoke which, in a scooter having a fork and a platform, is adapted to pivotally connect the fork to the platform so that the fork and a connected front wheel can be directionally pivoted by an operator in relation to the platform, the yoke comprising:
   (a) a braket comprising of a single metal sheet and including a substantially cylindrical housing with a seam portion, the cylindrical housing being adapted to pivotally house a stem of the fork to allow the stem to pivot freely within the housing; two approximately vertical panels which extend generally rearwardly, outwardly and downwardly from the housing to a horizontal bottom of each panel; and two supports which each extend horizontally inwardly from one of the panel bottoms to provide a surface on which a front of the platform is mounted; and
   (b) a plate member comprised of a single sheet of metal and including a flat portion which extends substantially horizontally between the two panels spaced above the supports to overlie and connect to the front of the platform, the plate member being affixed to the two panels;
   wherein the plate member further includes two legs which each extend downwardly from an outer margin of the flat portion adjacent to one of the panels, each leg being affixed to the adjacent panel to thereby affix the plate member to the panels.

19. The yoke specified in claim 18 wherein the cylindrical housing is welded closed at the seam portion, and the plate member legs are each welded to the adjacent bracket panel.

20. The yoke specified in claim 18 wherein each panel defines a longitudinal central crimp therein which increases the flexural strength of the panel.

21. A brake which, in a scooter having at least one wheel with a wheel rim which has at least one outwardly extending cylindrical braking surface, is adapted to brake that wheel, the brake comprising:
   (a) a lever which at a pivotal end thereof is adapted to be pivotally attached to the scooter near an end of the wheel, and which at a pedal end includes a pedal which is adapted to be pushed by an operator of the vehicle to brake the adjacent wheel;
   (b) at least one force member which at a first end thereof is pivotally connected to the lever between the pivotal end thereof and the pedal to gain a mechanical advantage, the force members each being adapted to extend along a side of the adjacent wheel to a second end which is adapted to be located adjacent to one of the braking surfaces and which is semi-circular to substantially conform in shape to the braking surface; and
   (c) at least one brake pad, each of which is attached to the semi-circular second end of one force member to transmit frictional braking force to the braking surface when the operator pushes the pedal;
   wherein the brake is adapted to be used to brake a wheel with a wheel rim having two outwardly extending cylindrical braking surfaces, wherein there are two force members connected to the lever at opposite sides thereof, the force members being in spaced parallel relation to one another so that they are adapted to be positioned along both sides of the adjacent wheel, and wherein there are two brake pads which are each attached to the semi-circular second end of one of the force members.

22. The brake specified in claim 21, wherein the lever is connected to a hinge which is adapted to be connected to a back of a scooter platform, so the brake can act upon a rear wheel having a rim with said braking surfaces.

* * * * *